(12) United States Patent
Setlur et al.

(10) Patent No.: US 8,406,458 B2
(45) Date of Patent: Mar. 26, 2013

(54) METHOD AND APPARATUS FOR INDICATING AN ANALYSIS CRITERIA

(75) Inventors: Vidya Raghavan Setlur, Cupertino, CA (US); Hiroshi Horii, Palo Alto, CA (US); Joseph Nathaniel Kaye, Mountain View, CA (US)

(73) Assignee: Nokia Corporation, Espoo (FI)

( * ) Notice: Subject to any disclaimer, the term of this patent is extended or adjusted under 35 U.S.C. 154(b) by 326 days.

(21) Appl. No.: 12/730,029

(22) Filed: Mar. 23, 2010

(65) Prior Publication Data

US 2011/0235851 A1 Sep. 29, 2011

(51) Int. Cl.
*G06K 9/00* (2006.01)
*G06F 15/16* (2006.01)

(52) U.S. Cl. ..................... 382/100; 709/204

(58) Field of Classification Search .......... 382/100; 705/21, 75; 707/999.1, 999.001, 999.003, 707/999.005; 715/14.64, 229; 455/418, 455/566; 709/204, 207, 217, 229, 230, 245, 709/246; 713/161
See application file for complete search history.

(56) References Cited

U.S. PATENT DOCUMENTS

| | | | |
|---|---|---|---|
| 6,675,350 B1 * | 1/2004 | Abrams et al. | 715/229 |
| 7,069,514 B2 * | 6/2006 | DeMesa et al. | 715/744 |
| 7,162,473 B2 | 1/2007 | Dumais et al. | |
| 7,383,310 B1 * | 6/2008 | Lyle et al. | 709/207 |
| 2004/0024846 A1 | 2/2004 | Randall | |
| 2004/0189696 A1 | 9/2004 | Shirriff | |
| 2006/0256012 A1 | 11/2006 | Fok et al. | |
| 2006/0259543 A1 | 11/2006 | Tindall | |
| 2006/0277191 A1 | 12/2006 | Badovinatz et al. | |
| 2008/0071796 A1 | 3/2008 | Ghuneim | |
| 2008/0071929 A1 | 3/2008 | Motte et al. | |
| 2008/0133488 A1 | 6/2008 | Bandaru et al. | |
| 2009/0094190 A1 | 4/2009 | Stephens | |
| 2009/0100407 A1 | 4/2009 | Bouillet et al. | |
| 2009/0115785 A1 | 5/2009 | Grandhi et al. | |
| 2009/0119157 A1 | 5/2009 | Dulepet | |
| 2009/0177957 A1 | 7/2009 | Bouillet et al. | |
| 2009/0187634 A1 | 7/2009 | Colon | |
| 2009/0209243 A1 | 8/2009 | Brown et al. | |
| 2010/0023545 A1 | 1/2010 | Gladkov et al. | |
| 2010/0023871 A1 | 1/2010 | Bederson et al. | |

(Continued)

FOREIGN PATENT DOCUMENTS

| | | |
|---|---|---|
| EP | 1494144 A2 | 1/2005 |
| WO | 01/08053 A2 | 2/2001 |
| WO | 2007109726 A2 | 9/2007 |
| WO | 2008066503 A2 | 6/2008 |

OTHER PUBLICATIONS

International Search Report and Written Opinion received in corresponding Patent Cooperation Treaty Application No. PCT/IB2011/051244, Aug. 3, 2011, 12 pages.

(Continued)

*Primary Examiner* — Abolfazl Tabatabai
(74) *Attorney, Agent, or Firm* — Alston & Bird LLP

(57) ABSTRACT

An apparatus, comprising a processor, memory including computer program code, the memory and the computer program code configured to, working with the processor, cause the apparatus to perform at least the following: receiving an indication that a first analysis chronicle has changed, the first analysis chronicle correlating to a first analysis criteria, and causing display of at least one indication of the first analysis criteria is disclosed.

21 Claims, 12 Drawing Sheets

U.S. PATENT DOCUMENTS

| | | | |
|---|---|---|---|
| 2010/0036856 A1 | 2/2010 | Portilla | |
| 2010/0042470 A1 | 2/2010 | Chang et al. | |
| 2010/0114739 A1 | 5/2010 | Johnston | |
| 2010/0121849 A1 | 5/2010 | Goeldi | |
| 2010/0214408 A1* | 8/2010 | McClure et al. | 348/143 |
| 2010/0318537 A1 | 12/2010 | Surendran et al. | |

OTHER PUBLICATIONS

International Search Report and Written Opinion received in related Patent Cooperation Treaty Application No. PCT/IB2011/051242, Jul. 13, 2011, 11 pages.

International Search Report and Written Opinion received in related Patent Cooperation Treaty Application No. PCT/IB2011/051243, Jul. 22, 2011, 12 pages.

Steve, "RocketVox Introduces Universal Inbox for Mobile Lives", http://www.showstoppers.com/?p=586, Mar. 31, 2009, 1 page.

"Art'nfact: Rapidly Visualizing Information from Web Pages", Research Paper, http://graphics.stanford.edu/~sakunkoo/artnfact/artnfacts-chi2009-v21.pdf, retrieved Aug. 23, 2011, 7 pages.

Office Action for U.S. Appl. No. 12/730,024 dated Mar. 28, 2012.

Office Action for U.S. Appl. No. 12/730,016 dated Sep. 14, 2012.

Office Action for U.S. Appl. No. 12/940,817 dated Nov. 26, 2012.

* cited by examiner

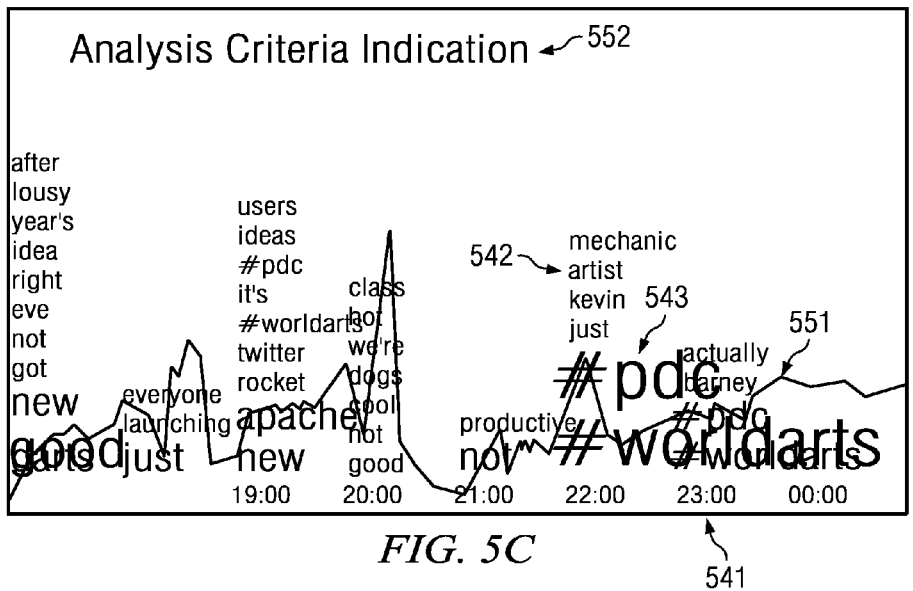
FIG. 5C
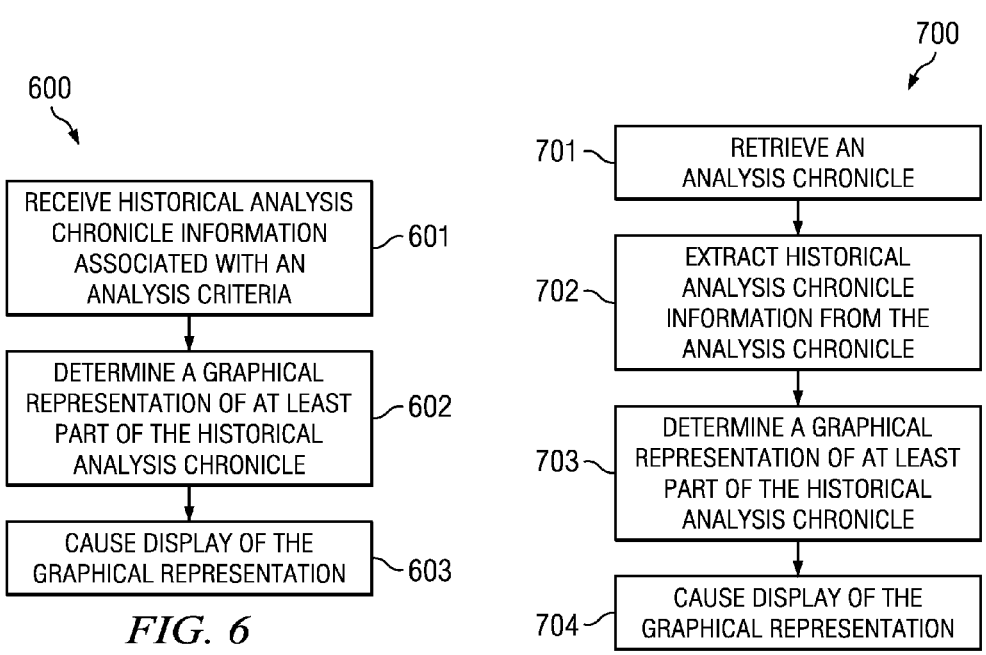
FIG. 6
FIG. 7

METHOD AND APPARATUS FOR INDICATING AN ANALYSIS CRITERIA

RELATED APPLICATIONS

This application relates to U.S. application Ser. No. 12/730,024, titled Method and Apparatus for Determining an Analysis Chronicle, filed Mar. 23, 2010, which is hereby incorporated by reference in its entirety.

This application relates to U.S. application Ser. No. 12/730,016, titled Method and Apparatus for Indicating Historical Analysis Chronicle Information, filed Mar. 23, 2010, which is hereby incorporated by reference in its entirety.

TECHNICAL FIELD

The present application relates generally to analyzing a set of information.

BACKGROUND

Electronic devices have seen a large market growth. There are many electronic devices that may receive information from multiple information sources.

SUMMARY

Various aspects of examples of the invention are set out in the claims.

An apparatus, comprising a processor, memory including computer program code, the memory and the computer program code configured to, working with the processor, cause the apparatus to perform at least the following: receiving an indication that a first analysis chronicle has changed, the first analysis chronicle correlating to a first analysis criteria, and causing display of at least one indication of the first analysis criteria is disclosed.

A method comprising receiving an indication that a first analysis chronicle has changed, the first analysis chronicle correlating to a first analysis criteria, and causing display of at least one indication of the first analysis criteria is disclosed.

A computer-readable medium encoded with instructions that, when executed by a computer, perform: receiving an indication that a first analysis chronicle has changed, the first analysis chronicle correlating to a first analysis criteria, and causing display of at least one indication of the first analysis criteria is disclosed.

BRIEF DESCRIPTION OF THE DRAWINGS

For a more complete understanding of embodiments of the invention, reference is now made to the following descriptions taken in connection with the accompanying drawings in which:

FIGS. 5A-5C are diagrams illustrating graphical representations of historical analysis chronicle information according to at least one example embodiment;

FIG. 6 is a flow diagram showing a set of operations for causing display of historical analysis chronicle information according to an example embodiment;

FIG. 7 is a flow diagram showing another set of operations for causing display of historical analysis chronicle information according to an example embodiment;

DETAILED DESCRIPTION OF THE DRAWINGS

An embodiment of the invention and its potential advantages are understood by referring to FIGS. 1 through 13 of the drawings.

The convergence of the Internet and wireless technologies offer an unprecedented level of convenience for information access using mobile devices. Applications are increasingly offering specialized services to a small number of users. There has been a tremendous growth in both the amount and quality of data available to these applications. A user may desire to have an apparatus automatically monitor a plurality of information sources. Furthermore, the user may desire to avoid being presented with superfluous information. For example, a similar news story may be received by way of a plurality of information sources. The user may desire to avoid being disrupted upon receiving the similar news stories after receiving the first news story.

Figure 1:
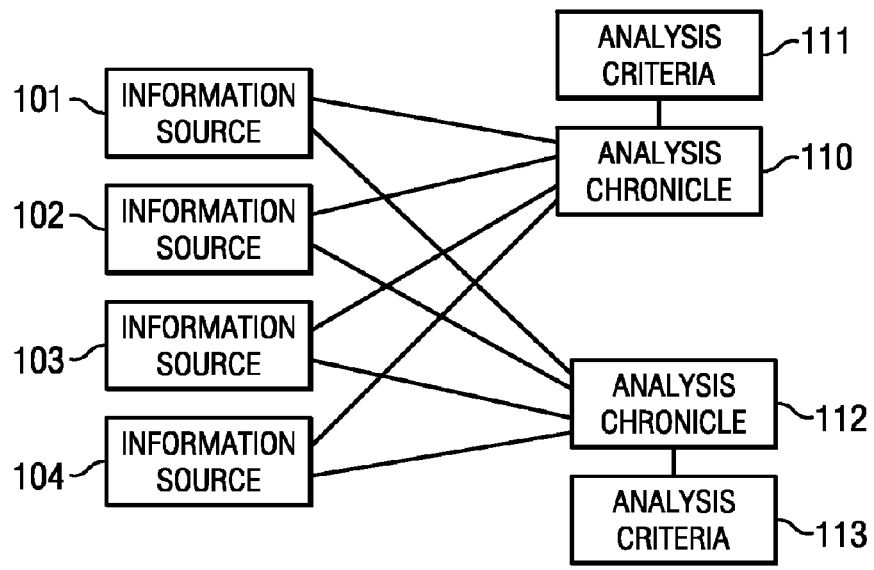
FIG. 1 is a diagram illustrating relationships among information sources, analysis criteria, and analysis chronicles according to at least one example embodiment.

FIG. 1 is a diagram illustrating relationships among information sources, analysis criteria, and analysis chronicles according to at least one example embodiment. The example of FIG. 1 is merely an example of relationships, and does not limit the scope of the claims. For example, number of information sources may vary, number of analysis criteria may vary, number of analysis chronicles may vary, and/or the like.

In the example of FIG. 1, analysis chronicle 110 is based, at least in part on analysis criteria 111 and information associated with at least one of information sources 101-104, and analysis chronicle 112 is based, at least in part on analysis criteria 113 and information associated with at least one of information sources 101-104. In the example of FIG. 1, analysis chronicle 110 is associated with a single analysis criteria, analysis criteria 111, and analysis chronicle 112 is associated with a single analysis criteria, analysis criteria 113. Analysis chronicles 110 and 112, and analysis criteria 111 and 113, may be similar as described with reference to FIGS. 2A-2C.

An information source relates to a component that sends information that may be analyzed, utilized, represented to a user, and/or the like. The type of information source may vary.

For example, an information source may relate to an email account, a personal networking account, a really simple syndications (RSS) feed, a cellular account, an instant messaging account, and/or the like. In an example embodiment, the type of information source varies across information sources. For example, information sources 101 and 102 may relate to an email account, while information source 103 relates to an instant messaging account, and information source 104 relates to a RSS feed. In another example, information source 101 relates to a personal networking account, information source 102 relates to a cellular account, information source 103 relates to an email account, and information source 104 relates to a RSS feed.

In an example embodiment, an apparatus bases the analysis chronicle, at least in part, at least one set of information associated with at least one information source. For example, the apparatus may receive a set of information associated with information source 101, and base the analysis chronicle, at least in part, on the set of information. The set of information may vary by type, format, structure, delivery, and/or the like. For example, a set of information associated with an email account may relate to an email message, an attachment embedded in an email message, a contact embedded in an email message, a calendar entry embedded in an email message, an email account message from an email server, such as a login failure message, and/or the like. In another example, a set of information associated with a personal networking account may relate to account information of another user, a message, an introduction, a notification associated with another user, photos, video and other media associated with another user, web links posted by another user and/or the like. In still another example, a set of information associated with a RSS feed may relate to a news feed, a web page, a blog entry, podcasts, reviews, and/or the like. In yet another example, a set of information associated with a cellular account may relate to a call indication, a text message, a voice message, and/or the like. In a further example, a set of information associated with an instant messaging account may relate to presence information, an instant message, photo or avatar associated with the account, and/or the like.

In an example embodiment, an information source provides a plurality of sets of information to an apparatus. For example, the information source may provide a succession of emails. A succession of sets of information may relate to a stream of information. For example, an apparatus may receive multiple sets of information by way of a stream associated with the information source.

Figure 13:
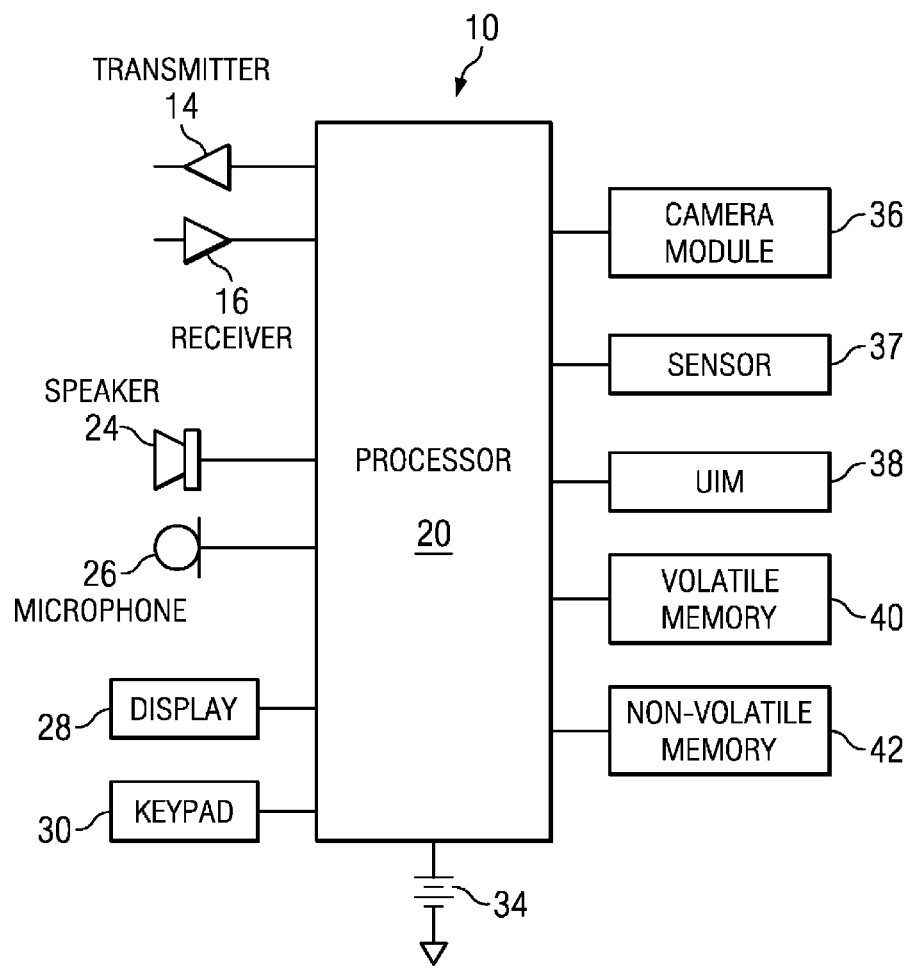
FIG. 13 is a block diagram showing an apparatus according to an example embodiment.

In an example embodiment, a set of information is received from an information source by way of a receiver, such as receiver 16 of FIG. 13. The apparatus may receive the set of information automatically, periodically, in response to a request, and/or the like.

Figure 2A:
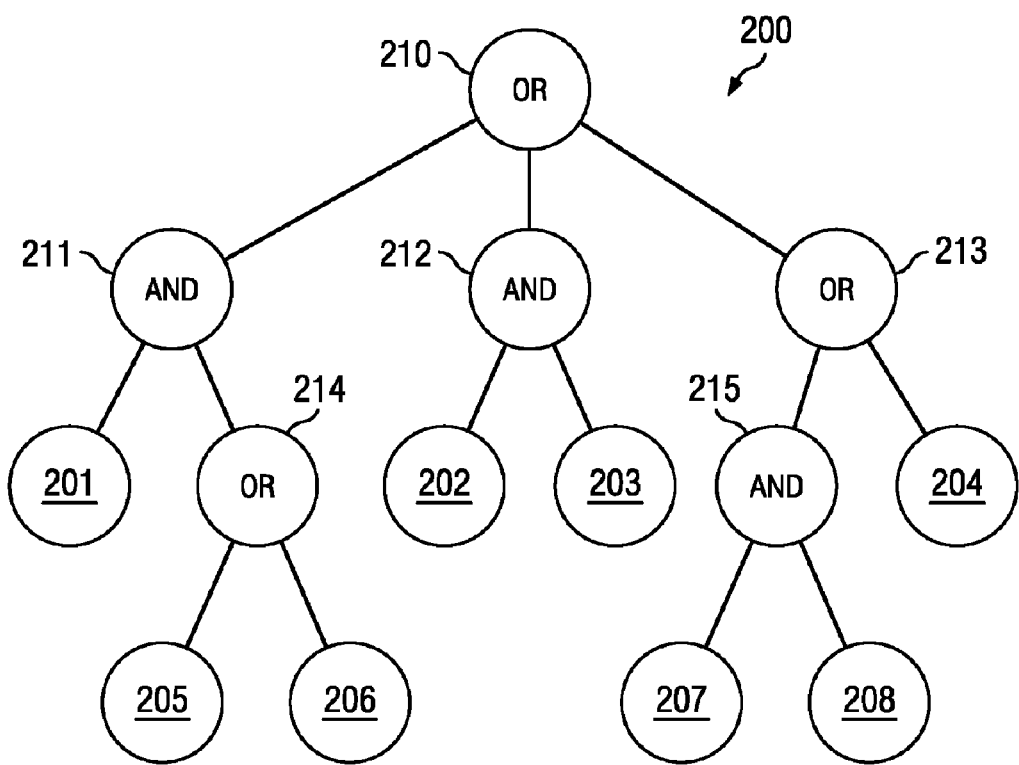
FIGS. 2A-2C are diagrams illustrating representations of analysis criteria and/or analysis chronicles according to at least one example embodiment.
Figure 2B:
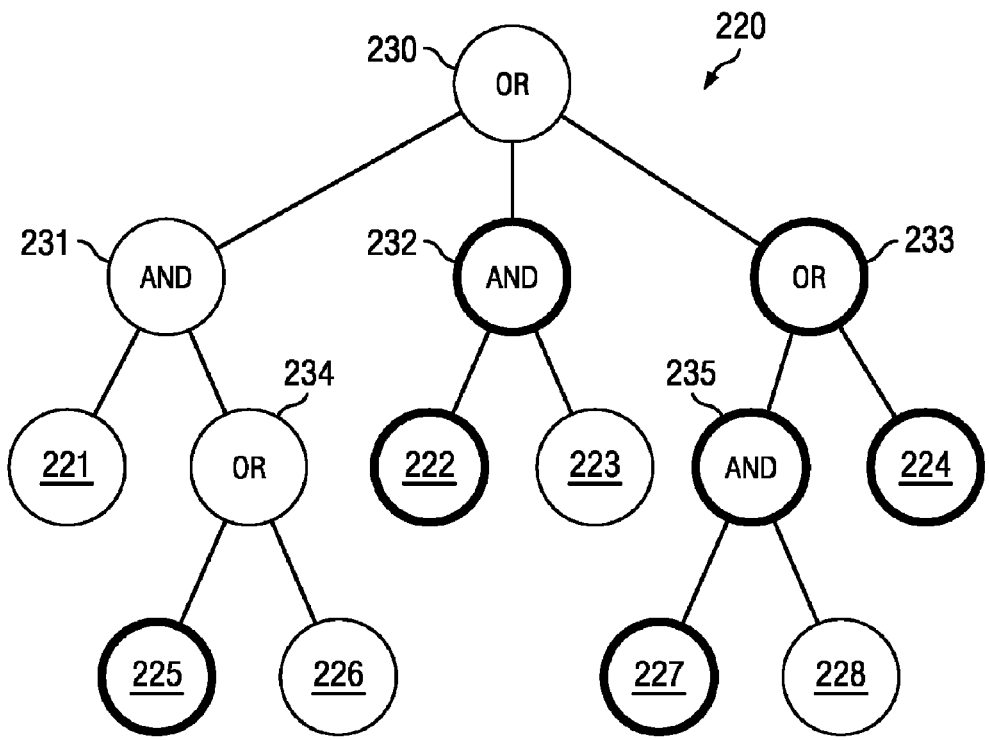
Figure 2C:
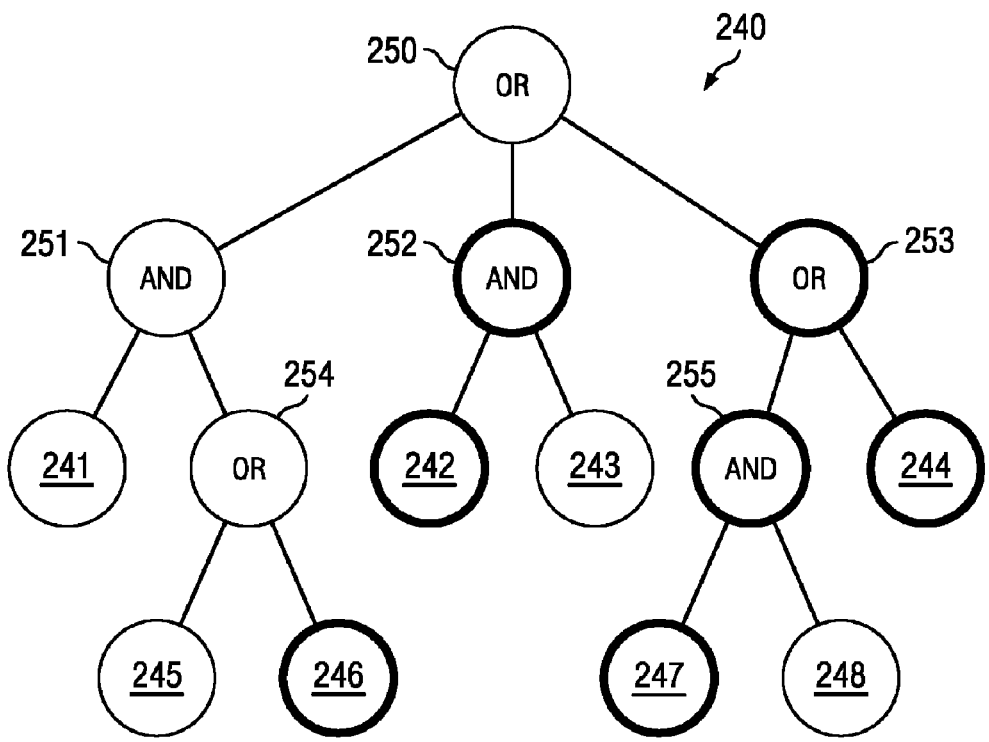

FIGS. 2A-2C are diagrams illustrating representations of analysis criteria and/or analysis chronicles according to at least one example embodiment. The examples of FIGS. 2A-2C are merely examples of analysis criteria and/or analysis chronicle, and do not limit the scope of the claims. For example, number of nodes may vary, relationships among nodes may vary, directives may vary, and/or the like. Furthermore, analysis criteria and/or analysis chronicle may vary by organization, structure, format, and/or the like. For example, even though the examples of FIGS. 2A-2C relate to a graph and/or a tree, the claims are not necessarily limited to a graph and/or a tree.

In an example embodiment, an apparatus analyzes a set of information based on an analysis criteria. The analysis criteria may be predetermined, user determined, stored, queried, received, dynamically determined, and/or the like. For example, the analysis criteria may be set by a user, for example using a keypad. In another example, the analysis criteria may be based, at least in part, on one or more default settings. In another example, the analysis criteria may be received, for example from an information source. In yet another example, the analysis criteria may be based, at least in part, on evaluation of historical information.

In an example embodiment, the apparatus analyzes a set of information from an information source based on an analysis criteria in relation to filtering. For example, the analysis may relate to filtering messages. In such an example, the analysis may relate to filtering messages to be deleted, filtering messages to store, filtering messages to be stored in a particular manner, and/or the like. In such an embodiment, the analysis criteria may relate to one or more filtering rules. For example, the analysis criteria may relate to a rule that a filter may use to determine whether the filter should be applied to the set of information.

In an example embodiment, the apparatus performs analysis based, at least in part, on the analysis criteria regarding sets of information associated with a plurality of information sources.

FIG. 2A is a diagram illustrating a representation of an analysis criteria 200 according to at least one example embodiment. Analysis criteria 200 comprises nodes 201-208, each relating to a condition, nodes 210-215, each relating to a directive associating nodes, and lines associating a node to another node. A condition may relate to a determination related to a part of the analysis. For example, a condition may relate to presence or absence of a word, presence or absence of a structure, presence or absence of a context, presence or absence of a trend, and/or the like. In such an example, a condition may relate to presence of the word "foot" in a set of information. In another example, a condition may relate to determination that, at least part of, the set of information indicates the structure of a party invitation. In still another example, a condition may relate to a determination that the context of, at least part of, the set of information relates to context of a restaurant review. In yet another example, a trend may relate to a rise in popularity of a particular topic through blog posts, one or more reviews, number of views of a news item or web page, and/or the like. In an example embodiment, nodes 201 and 203 may relate to presence of a word, node 202 may relate to presence of a trend, node 204 may relate to absence of a context, node 205 may relate to absence of a word, nodes 206 and 207 may relate to presence of a structure, and node 208 may relate to presence of the word of node 205. A directive may relate to the way one or more nodes associate with each other. A directive may relate to a Boolean operation, a spatial operation, and/or the like. For example, a directive may relate to an "or" operation, an "and" operation, an "is within 6 words of" operation, an "is adjacent to" operation, and/or the like.

In an example embodiment, an apparatus determines an analysis chronicle based, at least in part, on analysis preformed on at least part of, a set of information based, at least in part, on an analysis criteria. The analysis chronicle may comprise less than the entirety of the set of information. For example, the set of information my comprise at least one part that is not relevant to the analysis criteria. For example, the set of information may comprise a word that does not relate to any condition of the analysis criteria. In such an example, the word may be absent from the analysis chronicle.

In an example embodiment, the apparatus associates the analysis chronicle with the analysis criteria. For example, the apparatus may utilize an analysis chronicle in conjunction with a single analysis criteria. In such an example, the apparatus may store the analysis chronicle with a reference to the analysis criteria.

In the examples of FIGS. 2B-2C, the analysis chronicle is represented as a graph relating to the analysis criteria upon which the analysis chronicle is based. Such a graph may be referred to as an activity detection graph. Even though the analysis chronicles of FIGS. 2B-2C are represented as an activity detection graph, an analysis chronicle may relate to one or more different structures, such as a list, a queue, a table, a heap, and/or the like. In the examples of FIGS. 2B-2C, a node that is boldly outlined represents a node determined negatively and a node that is not boldly outlined represents a node determined positively. A node determined positively may relate to a node indicating a "true" value, a node with a non-null value, and/or the like. Such a non-null value may relate to a word, structure, context, trend, and/or the like. For example, a positively determined node relating to context may have a value indicating a word associated with the context. In such an example, the node may indicate the name of a restaurant where the context relates to the restaurant. In another example, a positively determined node relating to structure may have a value indicating a context associated with the structure. For example, the node may indicate a context of a restaurant when the structure associated with the node relates to a menu. A node negatively determined may relate to a node indication a "false" value, a null value, and/or the like.

In an example embodiment, an apparatus determines whether a set of information complies with an analysis criteria. An apparatus may determine that the set of information complies with the analysis criteria if a predetermined part of the analysis criteria is satisfied. For example, the apparatus may determine that the set of information complies with the analysis criteria if a root node, for example node 210 of FIG. 2A is satisfied. A node may considered as satisfied if the node is determined to be true, to have a non-null value associated with it, and/or the like.

FIG. 2B is a diagram illustrating a representation of an analysis chronicle 220 according to at least one example embodiment. Analysis criteria 220 comprises nodes 221-228, each relating to a condition, nodes 230-235, each relating to a directive associating nodes, and lines associating a node to another node. Nodes 230, 231, 221, 234, 223, 226, and 228 are determined positively. Nodes 232, 233, 222, 235, 224, 225, and 227 are determined negatively. Analysis chronicle 220 may indicate that the set of information complies with the analysis criteria in that the root node, node 230 is determined positively.

FIG. 2C is a diagram illustrating a representation of an analysis chronicle 240 according to at least one example embodiment. Analysis criteria 240 comprises nodes 241-248, each relating to a condition, nodes 250-255, each relating to a directive associating nodes, and lines associating a node to another node. Nodes 250, 251, 241, 254, 243, 245, and 248 are determined positively. Nodes 252, 253, 242, 255, 244, 246, and 247 are determined negatively. Analysis chronicle 240 may indicate that the set of information complies with the analysis criteria in that the root node, node 250 is determined positively.

In an example embodiment, an apparatus determines that a change occurred between two analysis chronicles, for example between analysis chronicle 220 and analysis chronicle 240. The apparatus may determine change based, at least in part, on presence of any difference between the analysis chronicles, such as a difference associated with node 245 of analysis chronicle 240 and node 225 of analysis chronicle 220. The apparatus may determine change based, at least in part, on presence of a significant difference between the analysis chronicles. For example, an apparatus may determine that a difference is significant if it is within a number of nodes from the root node. For example, the apparatus may determine that a difference between nodes is insignificant if the nodes are beyond 3 nodes from the root node. In another example, the apparatus may determine that a difference between nodes is significant if the nodes are within 4 nodes from the root node. The apparatus may determine significance based, at least in part, on a general setting, a predetermined value, a setting associated with an analysis criteria, evaluation of available resources, and/or the like. For example, the apparatus may determine a significance associated with an analysis criteria and a different significance associated with a different analysis criteria. In another example, the apparatus may determine a significance when the apparatus has adequate resources, and determine a different significance when the apparatus has limited resources.

Figure 3:
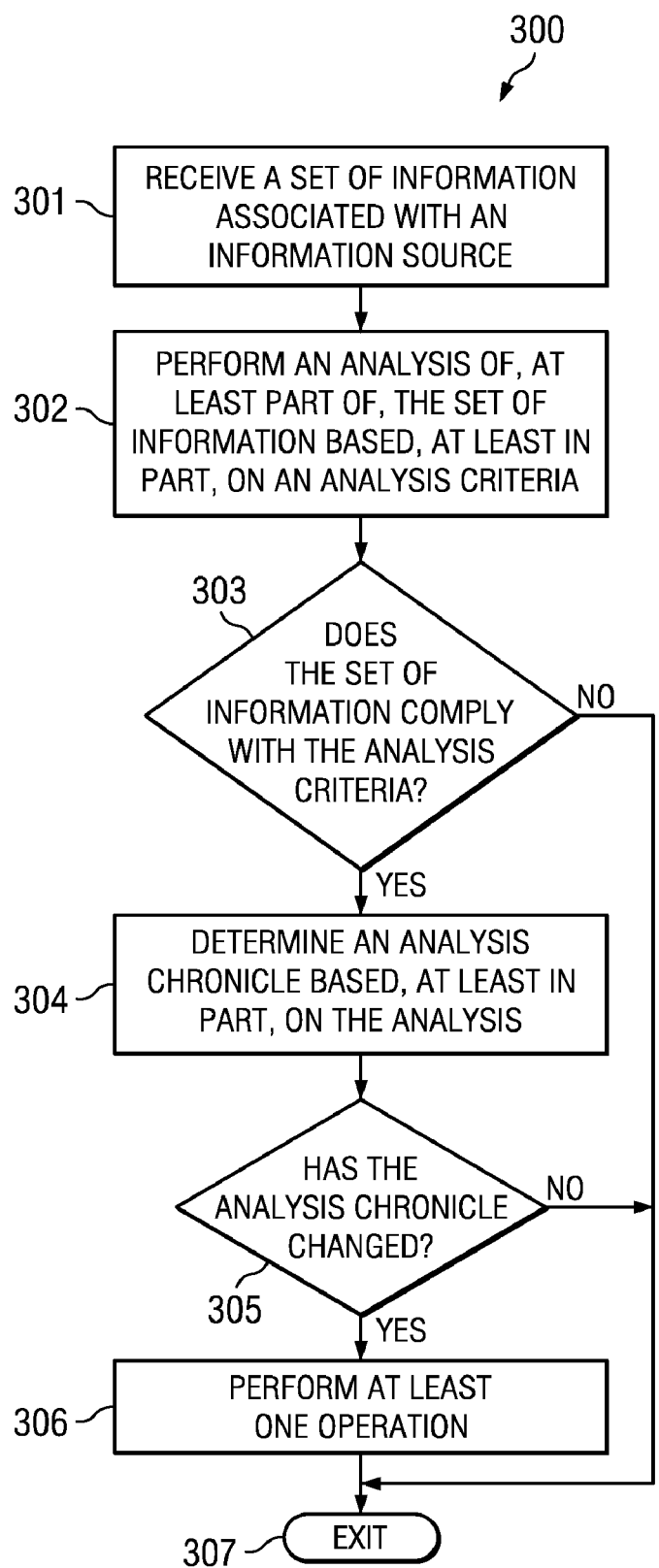
FIG. 3 is a flow diagram showing a set of operations for determining an analysis chronicle according to an example embodiment.

FIG. 3 is a flow diagram showing a set of operations 300 for determining an analysis chronicle according to an example embodiment. An apparatus, for example electronic device 10 of FIG. 13 or a portion thereof, may utilize the set of operations 300. The apparatus may comprise means, including, for example processor 20 of FIG. 13, for performing the operations of FIG. 3. In an example embodiment, an apparatus, for example device 10 of FIG. 13, is transformed by having memory, for example memory 42 of FIG. 13, comprising computer code configured to, working with a processor, for example processor 20 of FIG. 13, cause the apparatus to perform set of operations 300.

Without limiting the claims in any way, at least one technical effect associated with set of operations 300 may be reducing the likelihood of operations being performed upon receiving a similar set of information to a previously received set of information.

At block 301, the apparatus receives a set of information associated with an information source. The receiving, set of information, the information source, and the association between the set of information and the information source may be similar as described with reference to FIG. 1. The apparatus may receive the set of information by way of a network, for example, similar as described with reference to FIG. 13. The information source may be one of a plurality of information source.

At block 302, the apparatus performs an analysis of, at least part of, the set of information based, at least in part, on an analysis criteria. The analysis, set of information, and analysis criteria may be similar as described with reference to FIGS. 2A-2C.

At block 303, the apparatus determines whether the set of information complies with the analysis criteria. The determination and compliance may be similar as described with reference to FIGS. 2A-2C. If the apparatus determines that the set of information does not comply with the analysis criteria, flow exits at block 307. Otherwise, flow proceeds to block 304.

At block 304, the apparatus determines an analysis chronicle based, at least in part, on the analysis. The determination of the analysis chronicle may be similar as described with reference to FIGS. 2A-2C. The apparatus may associate the analysis chronicle with the analysis criteria. For example, the analysis chronicle may comprise a reference to the analysis criteria. In another example, the analysis criteria may comprise a reference to the analysis chronicle.

At block 305, the apparatus determines whether the analysis chronicle has changed. The determination that the analysis chronicle has changed may be similar as described with reference to FIGS. 2A-2C. If the apparatus determines that the analysis chronicle has not changed, flow exits at block 307. Otherwise, flow proceeds to block 306.

At block 306, the apparatus performs at least one operation in response to determining that the analysis chronicle has changed. The operation may relate to providing an indication that the analysis chronicle has changed. The operation may relate to providing an indication of the analysis criteria. The operation may relate to providing indication of at least part of the analysis chronicle.

Figure 4:
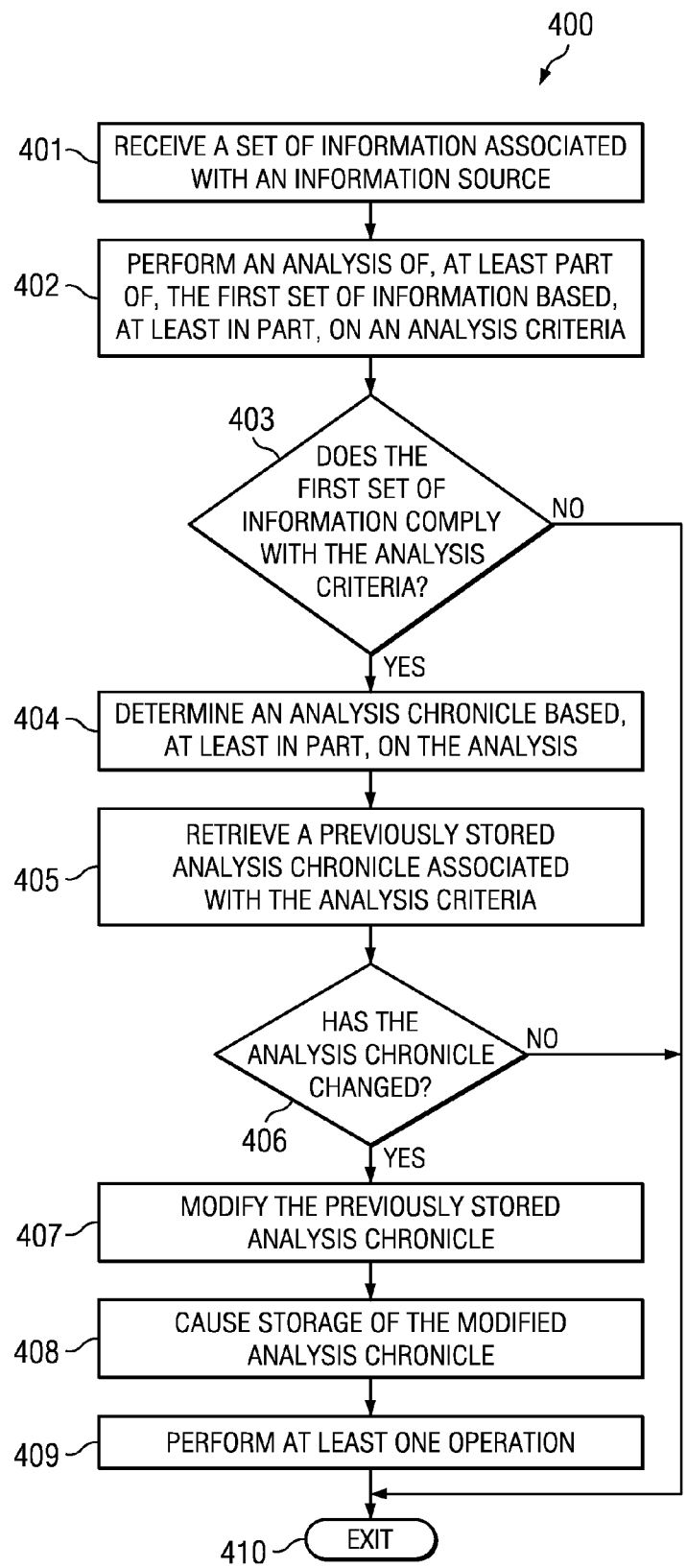
FIG. 4 is a flow diagram showing a set of operations for determining an analysis chronicle according to an example embodiment.

FIG. 4 is a flow diagram showing a set of operations 400 for determining an analysis chronicle according to an example embodiment. An apparatus, for example electronic device 10 of FIG. 13 or a portion thereof, may utilize the set of operations 400. The apparatus may comprise means, including, for example processor 20 of FIG. 13, for performing the operations of FIG. 4. In an example embodiment, an apparatus, for example device 10 of FIG. 13, is transformed by having memory, for example memory 42 of FIG. 13, comprising computer code configured to, working with a processor, for example processor 20 of FIG. 13, cause the apparatus to perform set of operations 400.

At block 401, the apparatus receives a set of information associated with an information source similar as described with reference to block 301 of FIG. 3.

At block 402, the apparatus performs an analysis of, at least part of, the set of information based, at least in part, on an analysis criteria similar as described with reference to block 302 of FIG. 3.

At block 403, the apparatus determines whether the set of information complies with the analysis criteria, similar as described with reference to block 303 of FIG. 3. If the apparatus determines that the set of information does not comply with the analysis criteria, flow exits at block 410. Otherwise, flow proceeds to block 404.

At block 404, the apparatus determines an analysis chronicle based, at least in part, on the analysis, similar as described with reference to block 304 of FIG. 4.

At block 405, the apparatus retrieves a previously stored analysis chronicle associated with the analysis criteria. The previously stored analysis chronicle may have been caused to be stored in relation to a previous iteration of set of operations 400, for example at block 408. The apparatus may retrieve the previously stored analysis chronicle from volatile memory, such as volatile memory 40 of FIG. 13, non-volatile memory, such as non-volatile memory 42 of FIG. 13, a different apparatus, and/or the like. For example, the apparatus may retrieve the previously stored analysis chronicle from a different apparatus by way of a receiver, such as receiver 16 of FIG. 13, a transmitter, such as transmitter 14 of FIG. 13, and/or the like.

At block 406, the apparatus determines whether the analysis chronicle has changed, similar as described with reference to block 305 of FIG. 3. If the apparatus determines that the analysis chronicle has not changed, flow exits at block 410. Otherwise, flow proceeds to block 407.

At block 407, the apparatus modifies the previously stored analysis chronicle. The modification may be based, at least in part, on the first analysis. The apparatus may modify the previously stored analysis chronicle by replacing part of the previously stored analysis chronicle that is inconsistent with the analysis chronicle. The apparatus may modify the previously stored analysis chronicle by combining the analysis chronicle with the previously stored analysis chronicle.

At block 408, the apparatus causes storage of the modified analysis chronicle. The apparatus may cause storage of the modified analysis chronicle to volatile memory, such as volatile memory 40 of FIG. 13, non-volatile memory, such as non-volatile memory 42 of FIG. 13, a different apparatus, and/or the like. For example, the apparatus may cause storage of the modified analysis chronicle on a different apparatus by way of a receiver, such as receiver 16 of FIG. 13, a transmitter, such as transmitter 14 of FIG. 13, and/or the like.

At block 409, the apparatus performs at least one operation in response to determining that the analysis chronicle has changed, similar as described with reference to block 306 of FIG. 3.

In an example embodiment, an apparatus may perform set of operations more than once upon more than one set of information. For example, at block 401, the apparatus may receive a second set of information associated with a second information source. The second information source may be a different information source than the first information source, a different type of information source than the first information source, and/or the like. In such an example, the apparatus, at block 402, may perform a second analysis of, at least part of, the second set of information based, at least in part, on the analysis criteria. In such an example, the apparatus, at block 407, may modify the analysis chronicle based, at least in part, on the second analysis.

Without limiting the claims in any way, at least one technical effect associated with set of operations 400 may be reducing the likelihood of operations being performed upon receiving a similar set of information to a previously received set of information.

Figure 5A:
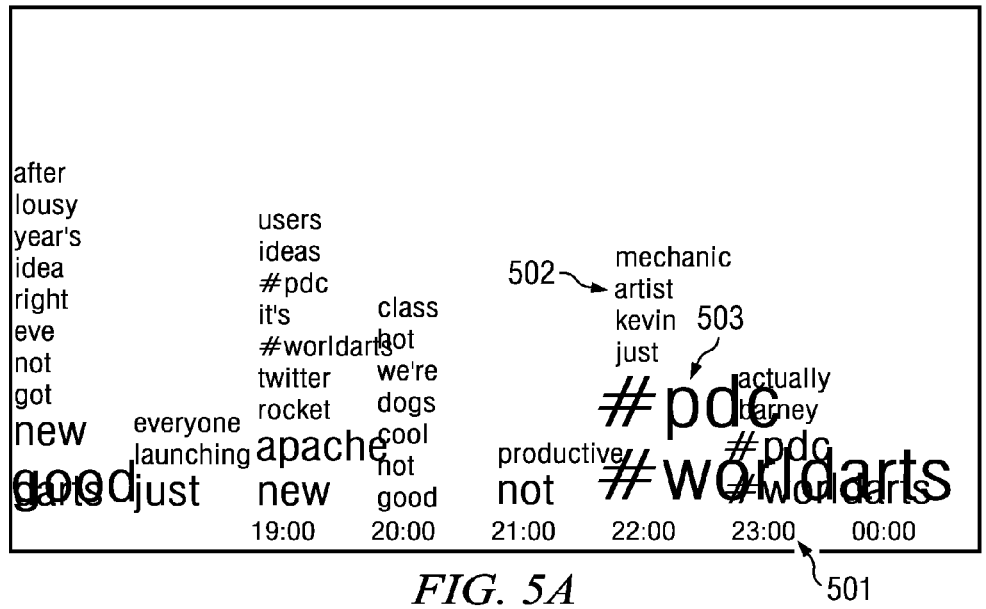
Figure 5B:
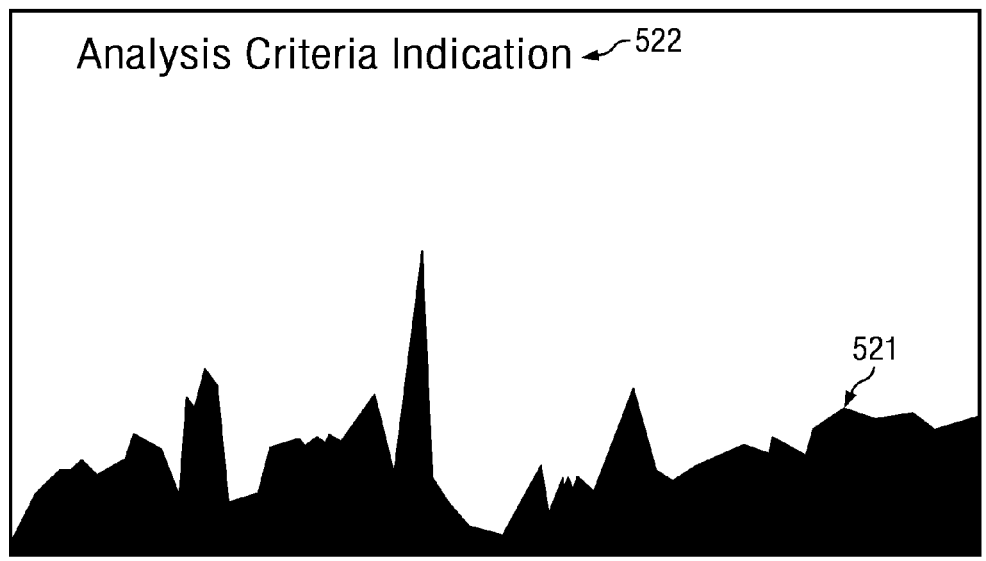

FIGS. 5A-5C are diagrams illustrating graphical representations of historical analysis chronicle information according to at least one example embodiment. The examples of FIGS. 5A-5C are merely examples of representations of historical analysis chronicle information, and do not limit the scope of the claims. For example, period of time may vary, information represented may vary, style of representation may vary, and/or the like. For example, even though the examples of FIGS. 5A-5C relate to a tag clouds and/or graphs, the claims are not necessarily limited to a tag clouds and/or graphs.

Historical analysis chronicle information may relate to a plurality of analyses associated with one or more analysis chronicles. For example, a historical analysis chronicle information may relate to one or more analysis chronicles associated with a plurality of sets of information. In another example, a historical analysis chronicle information may relate to one or more analysis chronicles associated with a plurality of information sources.

In an example embodiment, historical analysis chronicle information relates to time. For example, the historical analysis chronicle information may relate to one or more analysis chronicles over a period of time. The historical analysis chronicle information may relate to a single analysis criteria. For example, the historical analysis chronicle information may relate to one or more analysis chronicles associated with a single analysis criteria.

In an example embodiment, an analysis chronicle comprises historical analysis chronicle information. For example, the analysis chronicle may comprise information associated with a plurality of analyses associated with a period of time. In such an example, the analysis chronicle may comprise information associated with a first set of information analyzed at a time, and information associated with a second set of information analyzed at an earlier time. For example, the analysis chronicle may comprise nodes wherein a node comprises information associated with analyses associated with a period of time. In such an example, the node may comprise information associated with each analysis performed over the period of time.

In an example embodiment, a historical analysis chronicle information may exist separate from an analysis chronicle. For example, an apparatus may utilize one or more analysis chronicles associated with an information source to generate the historical analysis chronicle information. In such an example, the historical analysis chronicle information and the analysis chronicle information may be determined separately, stored separately, evaluated separately, and/or the like.

In an example embodiment, an apparatus causes display of a graphical representation of at least part of the historical analysis chronicle information. The graphical representation may relate to text, an image, a video, an animation, and/or the like. For example, the graphical representation may relate to a tag cloud. The graphical representation may relate to time. For example, the graphical representation may indicate time as an axis, indicate time by animation, indicate time by video, and/or the like.

In an example embodiment, which part of the analysis chronicle the apparatus associates with historical analysis chronicle information may vary, period of time the apparatus associates with historical analysis chronicle information may vary, and/or the like. For example, the apparatus may have a predetermined setting indicating which part of the analysis chronicle to associate with historical analysis information. In another example, the apparatus may allow a user to set the period of time to associate with the historical analysis chronicle information.

In an example embodiment, an apparatus may dynamically vary which part of the analysis chronicle the apparatus associates with historical analysis chronicle information, period of time the apparatus associates with historical analysis chronicle information, and/or the like. For example, the apparatus may determine period of time to associate with the historical analysis chronicle information based, at least in part, on availability of apparatus resources, such as memory, processor utilization, power, and/or the like.

FIG. 5A is a diagram illustrating a graphical representation of a historical analysis chronicle information according to at least one example embodiment. The example of FIG. 5A illustrates a tag cloud graphical representation of at least part of historical analysis chronicle information. The tag cloud may relate to word usage associated with the historical analysis chronicle information. The graphical representation indicates period of time 501 as a horizontal axis. Tags 502 and 503 relate to words associated with one or more sets of information corresponding to a time period. For example, tags 502 and 503 may relate to a time period indicated by 22:00. The apparatus may vary representation of the tag based, at least in part, on historical analysis chronicle information associated with the tag, such as number of times the word appears in one or more sets of information associated with the period of time. For example, the apparatus may represent a tag size in proportion to frequency the word that appears for the period of time. In another example, the apparatus may represent a tag color based upon context associated with the word in one or more sets of information. In such an example, the apparatus may represent a word with a blue color if the word is associated with a positive context in the sets of information associated with the historical analysis chronicle information.

FIG. 5B is a diagram illustrating a graphical representation of a historical analysis chronicle information according to at least one example embodiment. The example of FIG. 5B illustrates a graph graphical representation 521 of, at least part of, historical analysis chronicle information. The graph may relate to a count of received sets of information. For example, the graph may relate to sets of information received within a period of time. In such an example, the graph may indicate received sets of information over the amount of time as a progression from left part of the graphical representation to the right part of the graphical representation. In the example of FIG. 5B, the graphical representation comprises an analysis criteria indication 522. Even though the indication of the analysis criteria of FIG. 5B relates to a text representation, the indication may relate to an image indication, an animation indication, a video representation, and/or the like. The indication of analysis criteria may be similar as described with reference to FIGS. 9A-9D and FIGS. 10A-10C.

FIG. 5C is a diagram illustrating a graphical representation of a historical analysis chronicle information according to at least one example embodiment. The example of FIG. 5C illustrates a tag cloud and graph representation comprising indication of period of time 541, tags 542 and 543, graph 551, and analysis criteria indication 552. The tag cloud representation may be similar as described with reference to FIG. 5A. The graph representation may be similar as described with reference to FIG. 5B.

Without limiting the claims in any way, at least three technical effects associated with providing a graphical representation of historical analysis chronicle information are to allow the user to quickly view at least one aspect of the historical analysis chronicle information, avoiding user navigation through sets of information associated with referencing sets of information independently, allowing the user to quickly see context of the sets of information over a period of time.

FIG. 6 is a flow diagram showing a set of operations 600 for causing display of historical analysis chronicle information according to an example embodiment. An apparatus, for example electronic device 10 of FIG. 13 or a portion thereof, may utilize the set of operations 600. The apparatus may comprise means, including, for example processor 20 of FIG. 13, for performing the operations of FIG. 6. In an example embodiment, an apparatus, for example device 10 of FIG. 13, is transformed by having memory, for example memory 42 of FIG. 13, comprising computer code configured to, working with a processor, for example processor 20 of FIG. 13, cause the apparatus to perform set of operations 600.

At block 601, the apparatus receives historical analysis chronicle information associated with an analysis criteria. The analysis criteria may be associated with a plurality of information sources. The apparatus may receive the historical analysis chronicle information from volatile memory, such as volatile memory 40 of FIG. 13, non-volatile memory, such as non-volatile memory 42 of FIG. 13, a different apparatus, for example by way of receiver 16 of FIG. 13, and/or the like. The apparatus may receive the historical analysis chronicle information by receiving, at least part of, one or more analysis chronicles and determining historical analysis chronicle information based, at least in part, on the analysis chronicles. The historical analysis chronicle information may be similar as described with reference to FIGS. 5A-5C. The analysis criteria may be similar as described with reference to FIG. 1 and FIGS. 2A-2C. The information sources may be similar as described with reference to FIG. 1.

At block 602, the apparatus determines a graphical representation of at least part of the historical analysis chronicle. The determination of graphical representation may be similar as described with reference to FIGS. 5A-5C.

At block 603, the apparatus causes display of the graphical representation. The apparatus may cause display of the graphical information on a display comprised by the apparatus, such as display 28 of FIG. 13, on a display external to the apparatus, such as a monitor, and/or the like. The apparatus may cause display of the graphical representation by performing one or more operations, sending information to another device, and/or the like.

FIG. 7 is a flow diagram showing another set of operations 700 for causing display of historical analysis chronicle information according to an example embodiment. An apparatus, for example electronic device 10 of FIG. 13 or a portion thereof, may utilize the set of operations 700. The apparatus may comprise means, including, for example processor 20 of FIG. 13, for performing the operations of FIG. 7. In an example embodiment, an apparatus, for example device 10 of FIG. 13, is transformed by having memory, for example memory 42 of FIG. 13, comprising computer code configured to, working with a processor, for example processor 20 of FIG. 13, cause the apparatus to perform set of operations 700.

At block 701, the apparatus retrieves an analysis chronicle. The analysis chronicle may have been caused to be stored in relation to set of operations 300 of FIG. 3, set of operations 400 of FIG. 4, and/or the like. The apparatus may retrieve the analysis chronicle from volatile memory, such as volatile memory 40 of FIG. 13, non-volatile memory, such as non-volatile memory 42 of FIG. 13, a different apparatus, and/or the like. For example, the apparatus may retrieve the analysis chronicle from a different apparatus by way of a receiver, such as receiver 16 of FIG. 13, a transmitter, such as transmitter 14 of FIG. 13, and/or the like. The historical analysis chronicle information may be similar as described with reference to block 601 of FIG. 6.

At block 702, the apparatus extracts the historical analysis chronicle information from the analysis chronicle. Extracting the historical analysis chronicle information may relate to evaluating, at least part of, the analysis chronicle, evaluating, at least part of, the analysis chronicle related to a plurality of sets of information, evaluating, at least part of, the analysis chronicle related to a plurality of information sources, and/or the like.

At block 703, the apparatus determines a graphical representation of at least part of the historical analysis chronicle, similar as described with reference to block 602 of FIG. 6.

At block 704, the apparatus causes display of the graphical representation, similar as described with reference to block 603, of FIG. 6.

Figure 8:
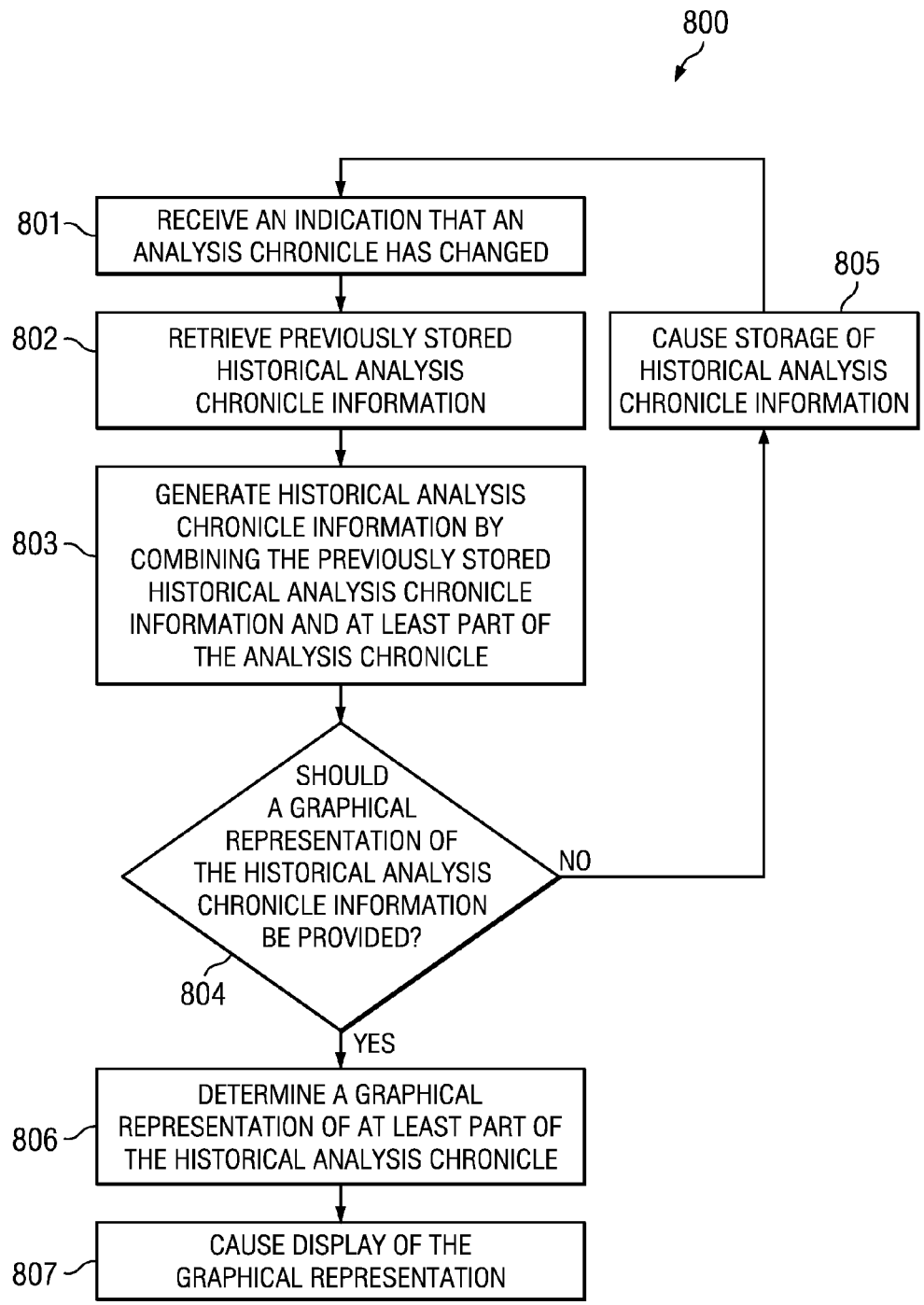
FIG. 8 is a flow diagram showing still another set of operations for causing display of historical analysis chronicle information according to an example embodiment.

FIG. 8 is a flow diagram showing still another set of operations 800 for causing display of historical analysis chronicle information according to an example embodiment. An apparatus, for example electronic device 10 of FIG. 13 or a portion thereof, may utilize the set of operations 800. The apparatus may comprise means, including, for example processor 20 of FIG. 13, for performing the operations of FIG. 8. In an example embodiment, an apparatus, for example device 10 of FIG. 13, is transformed by having memory, for example memory 42 of FIG. 13, comprising computer code configured to, working with a processor, for example processor 20 of FIG. 13, cause the apparatus to perform set of operations 800.

At block 801, the apparatus receives an indication that an analysis chronicle has changed. The analysis chronicle may correlate to the analysis criteria. The analysis chronicle may be similar as described with reference to FIG. 1 and FIGS. 2A-2C. The apparatus may receive the indication that an analysis chronicle has changed from volatile memory, such as volatile memory 40 of FIG. 13, non-volatile memory, such as non-volatile memory 42 of FIG. 13, a different apparatus, for example by way of receiver 16 of FIG. 13, and/or the like. The indication that an analysis chronicle has changed may be related to an operation, similar as described with reference to block 306 of FIG. 3, similar as described with reference to block 409 of FIG. 4, and/or the like.

At block 802, the apparatus retrieves a previously stored historical analysis chronicle information. The historical analysis chronicle information may be similar as described with reference to FIGS. 5A-5C. The previously stored historical analysis chronicle information may have been caused to be stored in relation to a previous iteration of set of operations 800, for example at block 805. The apparatus may retrieve the previously stored historical analysis chronicle information from volatile memory, such as volatile memory 40 of FIG. 13, non-volatile memory, such as non-volatile memory 42 of FIG. 13, a different apparatus, and/or the like. For example, the apparatus may retrieve the previously stored historical analysis chronicle information from a different apparatus by way of a receiver, such as receiver 16 of FIG. 13, a transmitter, such as transmitter 14 of FIG. 13, and/or the like.

At block 803, the apparatus generates the historical analysis chronicle information by combining the previously stored historical analysis chronicle information and at least part of the analysis chronicle. The apparatus may determine which part of the previously stored historical analysis chronicle information to combine similar as described with reference to FIGS. 5A-5C. The apparatus may determine which part of the analysis chronicle to combine similar as described with reference to FIGS. 5A-5C. The apparatus may generate the historical analysis chronicle information, at least in part, by including at least part of the previously stored historical analysis chronicle information. The apparatus may generate the historical analysis chronicle information, at least in part, by including at least part of the analysis chronicle. The apparatus may generate the historical analysis chronicle information by including, at least in part, information relating to a time associated with the indication that the analysis chronicle changed.

At block 804, the apparatus determines if a graphical representation of the historical analysis chronicle information should be provided. The apparatus may determine that a graphical representation should be provided based, at least in part, on interaction mode of the apparatus. For example, the apparatus may determine that the graphical representation of the historical analysis chronicle information should not be provided based, at least in part, on determination that such graphical representation would interfere with another operation, such as a phone call. In another example, the apparatus may determine that the graphical representation of the historical analysis chronicle information should be provided based on a predetermined setting, a user setting, and/or the like. In another example, the apparatus may determine that the graphical representation of the historical analysis chronicle information should be provided based, at least in part, on determination that related graphical information is being provided to the user, for example information associated with a set of information associated with the historical analysis chronicle information, indication of an analysis criteria associated with the historical analysis chronicle information, and/or the like. If the apparatus determines that the graphical representation of the historical analysis chronicle information should not be provided, flow proceeds to block 805. Otherwise, flow proceeds to block 806.

At block 805, the apparatus causes storage of at least part of the generated historical analysis chronicle information. The apparatus may cause storage of the generated historical analysis chronicle information to volatile memory, such as volatile memory 40 of FIG. 13, non-volatile memory, such as non-volatile memory 42 of FIG. 13, a different apparatus, and/or the like. For example, the apparatus may cause storage of the generated historical analysis chronicle information on a different apparatus by way of a receiver, such as receiver 16 of FIG. 13, a transmitter, such as transmitter 14 of FIG. 13, and/or the like. The apparatus may cause storage of information associated with a time associated with the indication that the analysis chronicle changed. The apparatus may perform the storage in response to the indication that the analysis chronicle has changed. The flow proceeds to block 801.

At block 806, the apparatus determines a graphical representation of at least part of the historical analysis chronicle, similar as described with reference to block 602 of FIG. 6.

At block 807, the apparatus causes display of the graphical representation, similar as described with reference to block 603 of FIG. 6.

FIGS. 9A-9D are diagrams illustrating indications of analysis criteria according to at least one example embodiment. The examples of FIGS. 9A-9D are merely examples of indications of analysis criteria information, and do not limit the scope of the claims. For example, size of indication may vary, information indicated may vary, style of indication may vary, number of indications may vary, and/or the like. An apparatus may cause the indications of FIGS. 9A-9D to be displayed.

In an example embodiment, an apparatus causes display of at least one indication of an analysis criteria. The indication of the analysis criteria may relate to text information, image information, animation information, video information, and/or the like. For example, the indication of the analysis criteria may comprise text information indicating a name associated with the analysis criteria. In another example, the indication of the analysis criteria may comprise image information indicating an image associated with the analysis criteria, such as an icon, art, a photograph, and/or the like.

In an example embodiment, the apparatus causes display of at least one indication of an analysis chronicle information associated with the analysis criteria. The analysis chronicle information may relate to, at least part of an analysis chronicle associated with the analysis criteria. The indication of the analysis chronicle information may relate to information contained in the analysis chronicle, information associated with status of an analysis chronicle, and/or the like. For example, the apparatus may cause display of at least one indication that the first analysis chronicle has changed. The change may be similar as described with reference to FIGS. 2A-2C, FIG. 3, and FIG. 4. The indication of the analysis chronicle information may relate to amount of change, elapsed time since change, and/or the like. For example, the indication of the analysis chronicle information may relate to number of sets of information associated with the analysis chronicle since a user has viewed sets of information associated with the analysis chronicle.

In an example embodiment, the indication of the analysis chronicle information is related to the indication of the analysis criteria. For example, the indication of the analysis chronicle information may relate to a property of the indication of the analysis criteria, such as color, size, transparency, lighting, font, and/or the like. In another example, the indication of the analysis chronicle information may relate to presence or absence of the indication of the analysis criteria. In still another example, the apparatus may perform causing display of the at least one indication of the analysis chronicle information such that the indication of the analysis chronicle information may be visually associated with the indication of the analysis criteria. Such visual association may relate to proximity, inclusion within a boundary, sharing of a property, and/or the like. For example, the apparatus may cause display of the indication of the analysis chronicle information within a box within which the indication of the analysis criteria was caused to be displayed.

In an example embodiment, the apparatus causes display of at least part of a set of information associated with the analysis criteria. The set of information may relate to an analysis chronicle associated with the analysis criteria. For example, the set of information may relate to a set of information associated with a change in the analysis chronicle. The apparatus may receive, at least part of, the set of information prior to causing display of the, at least part of, the set of information. The apparatus may determine which part of the set of information to cause to be displayed. For example, the apparatus may determine which part of the set of information to cause to be displayed based, at least in part, on amount of display available, which part of the set of information relates to a change in the analysis chronicle, and/or the like. The apparatus may perform causing display of the part of the set of information such that the indication of the set of information may be visually associated with the indication of the analysis criteria. Such visual association may relate to proximity, inclusion within a boundary, sharing of a property, and/or the like. For example, the apparatus may cause display of the part of the set of information adjacent to the indication of the analysis criteria.

In an example embodiment, the apparatus causes display of an indication of an information source associated with the analysis criteria. The information source may relate to an analysis chronicle associated with the analysis criteria. For example, the information source may be associated with a set of information associated with a change in the analysis chronicle. The apparatus may receive notification regarding the information source prior to causing display of the, at least part of, the set of information. The apparatus may perform causing display of the indication of the information source such that the indication of the information source may be visually associated with the indication of the analysis criteria. Such visual association may relate to proximity, inclusion within a boundary, sharing of a property, and/or the like. For example, the apparatus may cause display of the indication of the part of the set of information adjacent to the indication of the analysis criteria. The apparatus may perform causing display of the indication of the information source such that the indication of the information source may be visually associated with the at least part of the set of information. Such visual association may relate to proximity, inclusion within a boundary, sharing of a property, and/or the like. For example, the apparatus may cause display of the indication of the information source adjacent to the part of the set of information.

Figure 9A:
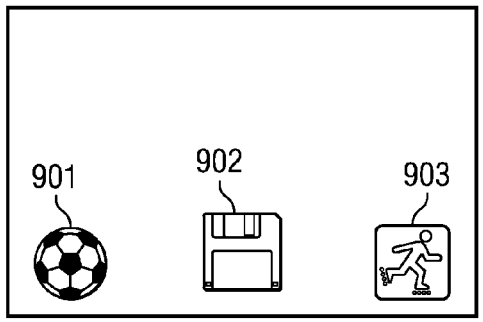
FIGS. 9A-9D are diagrams illustrating indications of analysis criteria according to at least one example embodiment.

FIG. 9A is a diagram illustrating indication of analysis criteria 901, indication of analysis criteria 902, and indication of analysis criteria 903 according to at least one example embodiment. In the example of FIG. 9A, indications of analysis criteria 901-903 comprise images. Indication of analysis criteria 901 may relate to an analysis criteria that is related to soccer information. Indication of analysis criteria 902 may relate to an analysis criteria that is related to computer information. Indication of analysis criteria 903 may relate to an analysis criteria that is related to skating information.

Figure 9B:
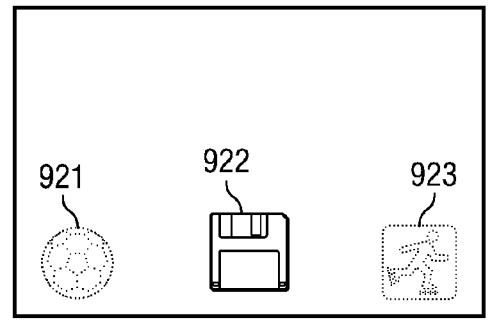

FIG. 9B is a diagram illustrating indication of analysis criteria 921, indication of analysis criteria 922, and indication of analysis criteria 923 according to at least one example embodiment. In the example of FIG. 9B, indications of analysis criteria 921-923 comprise images. Indication of analysis criteria 921 may relate to an analysis criteria that is related to soccer information. Indication of analysis criteria 922 may relate to an analysis criteria that is related to computer information. Indication of analysis criteria 923 may relate to an analysis criteria that is related to skating information. Indications of analysis criteria 921 and 923 have an associated property of partial transparency, and indication of analysis criteria 922 has an associated property of no transparency. In the example of FIG. 9B, an apparatus may indicate analysis chronicle information with transparency. For example, the apparatus may indicate change in analysis chronicle by an indication of analysis criteria having no transparency, such as indication of analysis criteria 922. In another example, the apparatus may indicate time since a change in analysis chronicle by amount of transparency. In such an example, lack of transparency of indication of analysis criteria 922 may indicate a more recent change in analysis chronicle than indicated by the transparency of indication of analysis criteria 923.

Figure 9C:
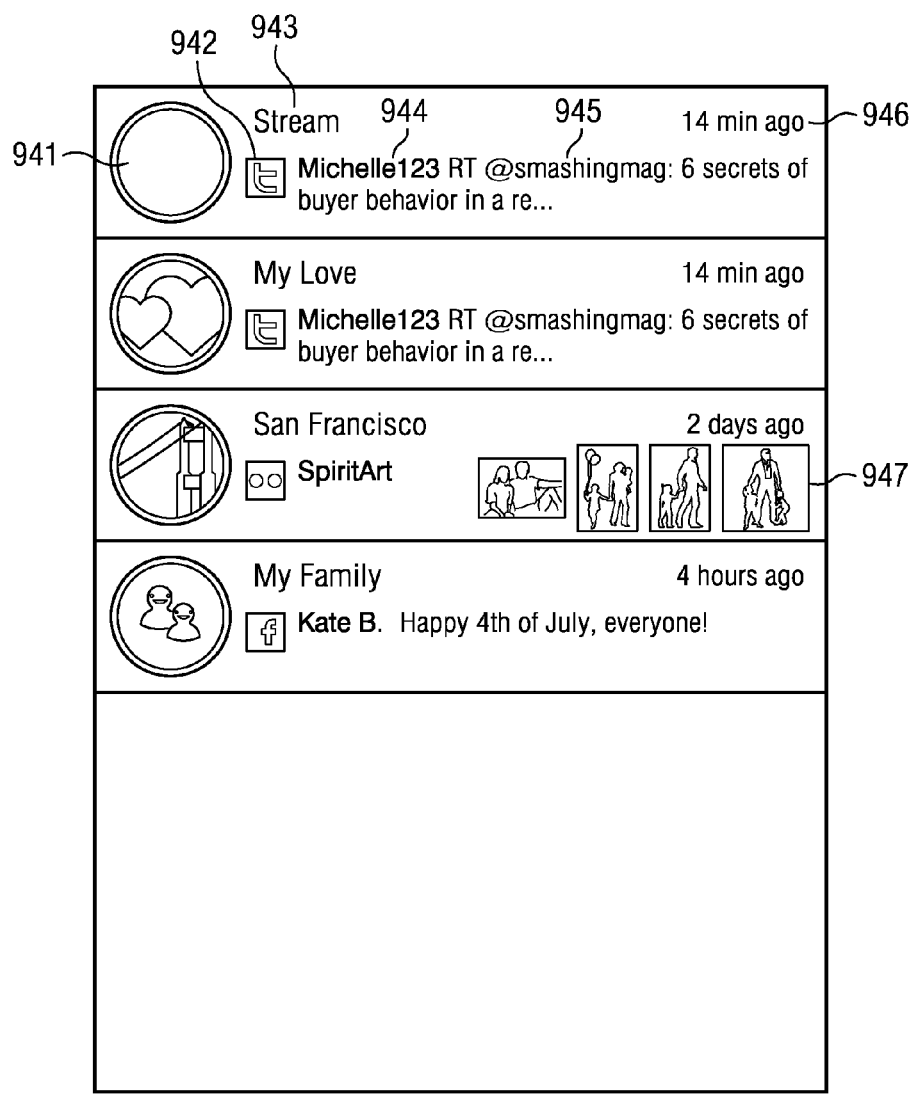

FIG. 9C is a diagram illustrating a plurality of indications of analysis criteria associated with a plurality of analysis criteria according to at least one example embodiment. In the example of FIG. 9C, an apparatus provides indication of a first analysis criteria comprising image 941 and text information 943. The apparatus provides an indication of analysis chronicle information comprising text information 946. Text information 946 indicates time elapsed since the analysis chronicle changed. The text information 946 is visually associated with image 941 and text information 946 by proximity and inclusion in a boundary. The apparatus provides indication of a set of information associated with the first analysis criteria comprising text information 944, which indicates a sender of the set of information, and text information 945, which relates to part of the set of information. Text information 944 and text information 945 are visually associated with image 941 and text information 946 by proximity and inclusion in a boundary. The example of FIG. 9C illustrates other indications associated with other analysis criteria, such as images 947 indicating part of a set of information associated with a second analysis criteria. The apparatus provides indication of an information source associated with the first analysis criteria comprising image 942. Image 942 is visually associated with image 941 and text information 946 by proximity and inclusion in a boundary. Image 942 is visually associated with text information 944 and text information 945 by proximity and inclusion in a boundary.

Figure 9D:
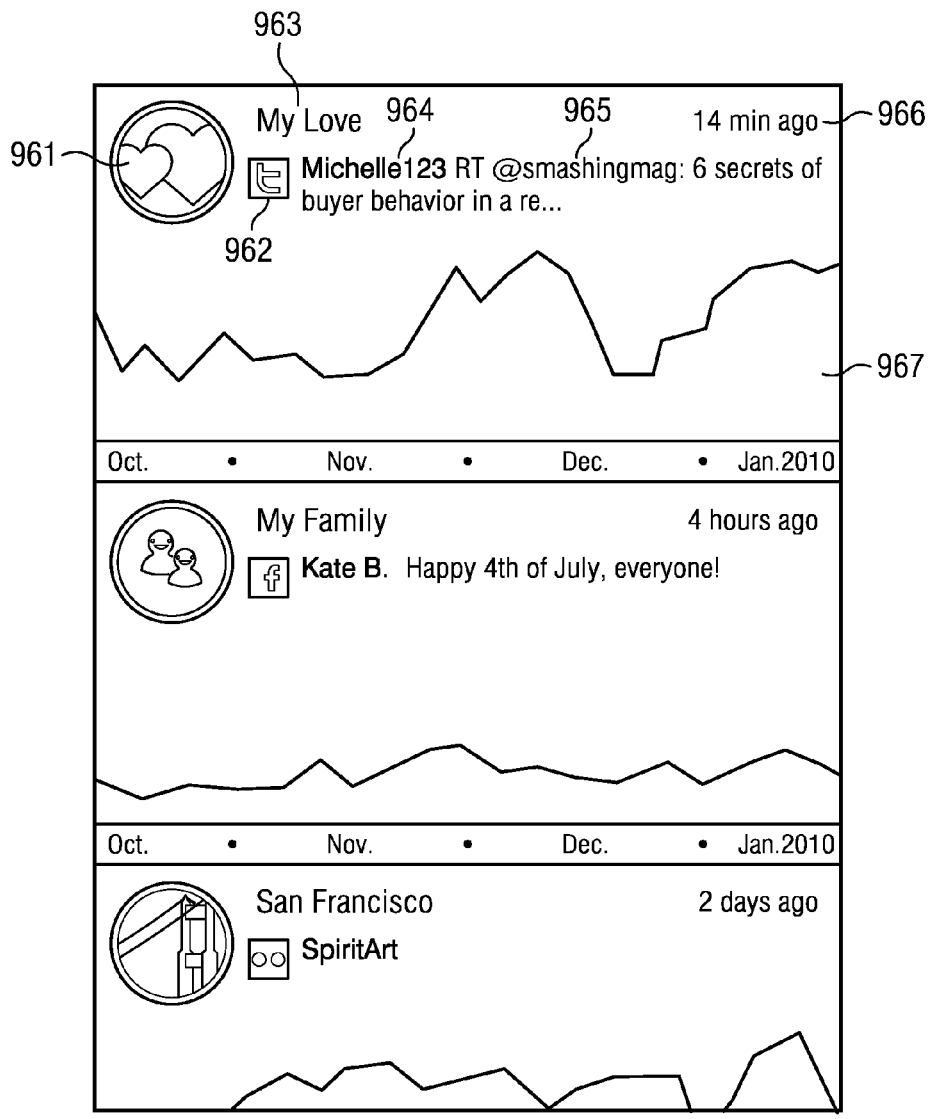

FIG. 9D is a diagram illustrating a plurality of indications of analysis criteria associated with a plurality of analysis criteria according to at least one example embodiment. In the example of FIG. 9D, an apparatus provides indication of a first analysis criteria comprising image 961 and text information 963. The apparatus provides an indication of analysis chronicle information comprising text information 966. Text information 966 indicates time elapsed since the analysis chronicle changed. The text information 966 is visually associated with image 961 and text information 966 by proximity and inclusion in a boundary. The apparatus provides indication of a set of information associated with the first analysis criteria comprising text information 964, which indicates a sender of the set of information, and text information 965, which relates to part of the set of information. Text information 964 and text information 965 are visually associated with image 961 and text information 966 by proximity and inclusion in a boundary. The example of FIG. 9D illustrates other indications associated with other analysis criteria. The apparatus provides indication of an information source associated with the first analysis criteria comprising image 962. Image 962 is visually associated with image 961 and text information 966 by proximity and inclusion in a boundary. Image 962 is visually associated with text information 964 and text information 965 by proximity and inclusion in a boundary. The apparatus provides indication of historical analysis chronicle information, associated with the first analysis criteria, comprising graphical representation 967. Graphical representation 962 is visually associated with image 961 and text information 966 by proximity and inclusion in a boundary. Even though the example of FIG. 9D indicates a graphical representation of historical analysis chronicle information comprising a graph, type of indication associated with the historical analysis chronicle information.

Figure 10A:
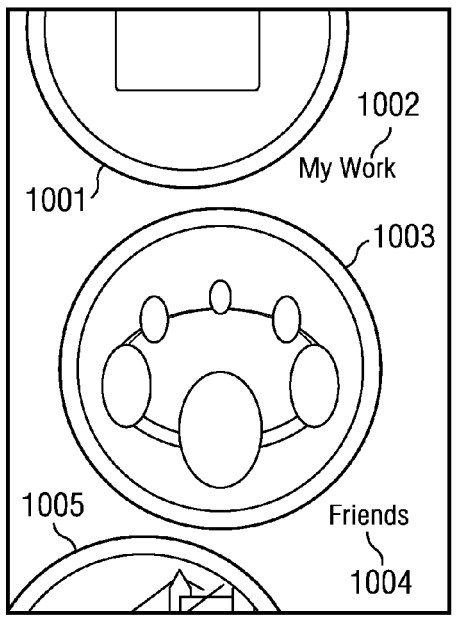
FIGS. 10A-10C are diagrams illustrating indications of analysis criteria relating to lenses according to at least one example embodiment.
Figure 10B:
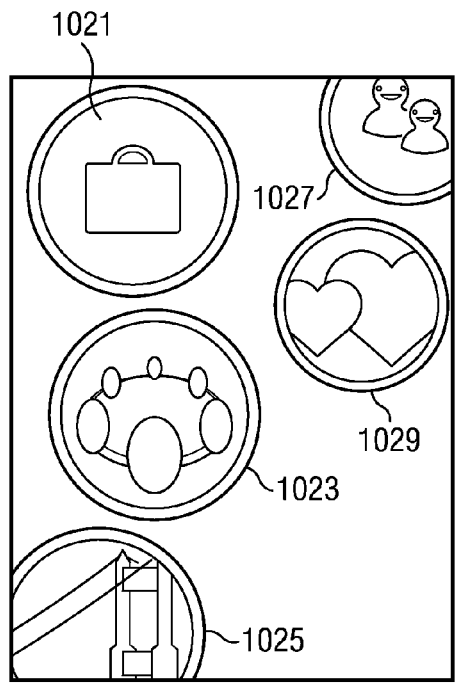
Figure 10C:
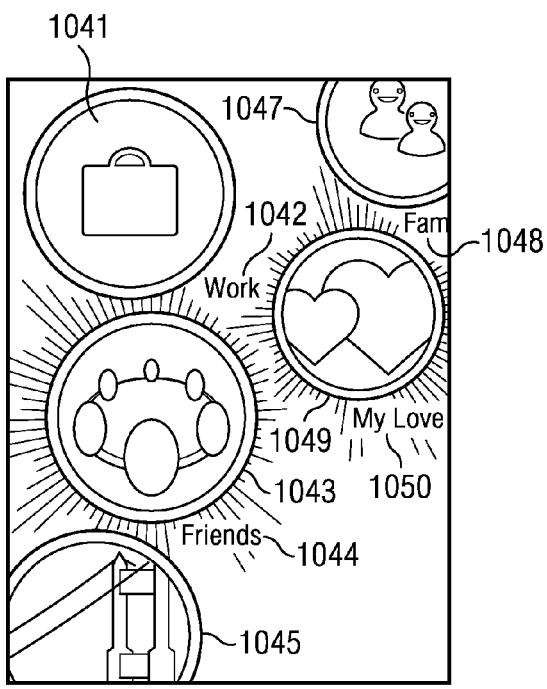

FIGS. 10A-10C are diagrams illustrating indications of analysis criteria relating to lenses according to at least one example embodiment. The examples of FIGS. 10A-10C are merely examples of indications of analysis criteria information, and do not limit the scope of the claims. For example, size of indication may vary, information indicated may vary, style of indication may vary, number of indications may vary, and/or the like.

In an example embodiment, an apparatus may indicate an analysis criteria with an image relating to a lens. The lens may comprise an image indicating the analysis criteria. The image indicating analysis criteria may be partially transparent. The apparatus may visually associate an indication, such as an indication of an analysis chronicle, an indication of historical analysis chronicle information, indication of an information source, indication of at least part of a set of information, and/or the like, with the lens by positioning the lens to coincide, or be proximate to the indication. For example, the apparatus may visually associate a lens with an indication by representing the lens to be covering the indication. In another example, the apparatus may visually associate a lens with an indication by representing the indication within the lens.

FIG. 10A is a diagram illustrating lense 1001 and text information 1002 indicating a first analysis criteria, lens 1003 and text information 1004 indicating a second analysis criteria, and lens 1005 indicating a third analysis criteria. Lenses 1001, 1003, and 1005, may each comprise a partially transparent image that indicates its associated analysis criteria. The central location of lens 1003 may correspond to an indication of historical analysis chronicle information, such as a short time since an associated analysis chronicle changed.

FIG. 10B is a diagram illustrating lens 1021 indicating a first analysis criteria, lens 1023 indicating a second analysis criteria, lens 1025 indicating a third analysis criteria, lens 1027 indicating a fourth analysis criteria, and lens 1029 indicating a fifth analysis criteria. Lenses 1021, 1023, 1025, 1027, and 1029 may each comprise a partially transparent image that indicates its associated analysis criteria. The larger size of lenses 1021, 1023, and 1025 may correspond to an indication of historical analysis chronicle information, such as a large amount of received sets of information associated analysis chronicle changed.

FIG. 10C is a diagram illustrating lens 1041 and text information 1042 indicating a first analysis criteria, lens 1043 and text information 1044 indicating a second analysis criteria, lens 1045 and text information 1046 indicating a third analysis criteria, lens 1047 and text information 1048 indicating a fourth analysis criteria, and lens 1049 and text information 1050 indicating a fifth analysis criteria. Lenses 1041, 1043, 1045, 1047, and 1049 may each comprise a partially transparent image that indicates its associated analysis criteria. In the example of FIG. 10C, the apparatus represents lenses 1043 and 1049 with a lighting effect. The lighting effect may relate to an effect applied to the lens that provides a visualization of lighting that differs from at least one other indication. For example, a lighting effect may relate to strength of backlight associated with the lens, shading associated with the lens, and/or the like. The lighting effect of lenses 1043 and 1049 correspond to an indication of analysis chronicle information, such as a change in analysis chronicle.

Figure 11:
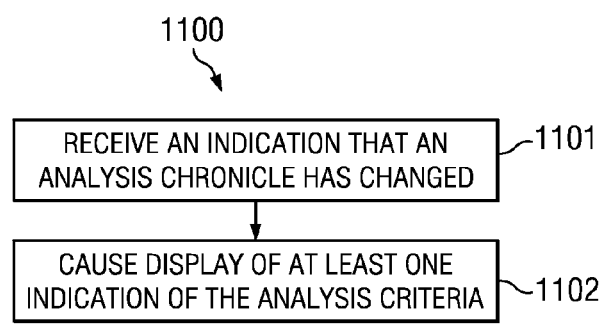
FIG. 11 is a flow diagram showing a set of operations for causing display of indication of analysis criteria according to an example embodiment.

FIG. 11 is a flow diagram showing a set of operations 1100 for causing display of indication of analysis criteria according to an example embodiment. An apparatus, for example electronic device 10 of FIG. 13 or a portion thereof, may utilize the set of operations 1100. The apparatus may comprise means, including, for example processor 20 of FIG. 13, for performing the operations of FIG. 11. In an example embodiment, an apparatus, for example device 10 of FIG. 13, is transformed by having memory, for example memory 42 of FIG. 13, comprising computer code configured to, working with a processor, for example processor 20 of FIG. 13, cause the apparatus to perform set of operations 1100.

At block 1101, the apparatus receives an indication that an analysis chronicle has changed. The indication that the analysis chronicle has changed may be similar as described with reference to block 306 of FIG. 3. The analysis chronicle may be similar as described with reference to FIG. 1 and FIGS. 2A-2C. The analysis chronicle may correlate to an analysis criteria, which may be associated with a plurality of information sources. The correlation, analysis criteria, information sources, and association between analysis criteria and information sources may be similar as described with reference to FIG. 1 and FIGS. 2A-2C.

At block 1102, the apparatus causes display of at least one indication of the analysis criteria. The apparatus may cause display of the analysis criteria on a display comprised by the apparatus, such as display 28 of FIG. 13, on a display external to the apparatus, such as a monitor, and/or the like. The apparatus may cause display of the analysis criteria by performing one or more operations, sending information to another device, and/or the like. The apparatus may cause display of the indication of the analysis criteria in response to receiving the indication that the first analysis chronicle has changed. The indication of the analysis criteria may be similar as described with reference to FIGS. 5A-5C, FIGS. 9A-9D, AND FIGS. 10A-10C.

Figure 12:
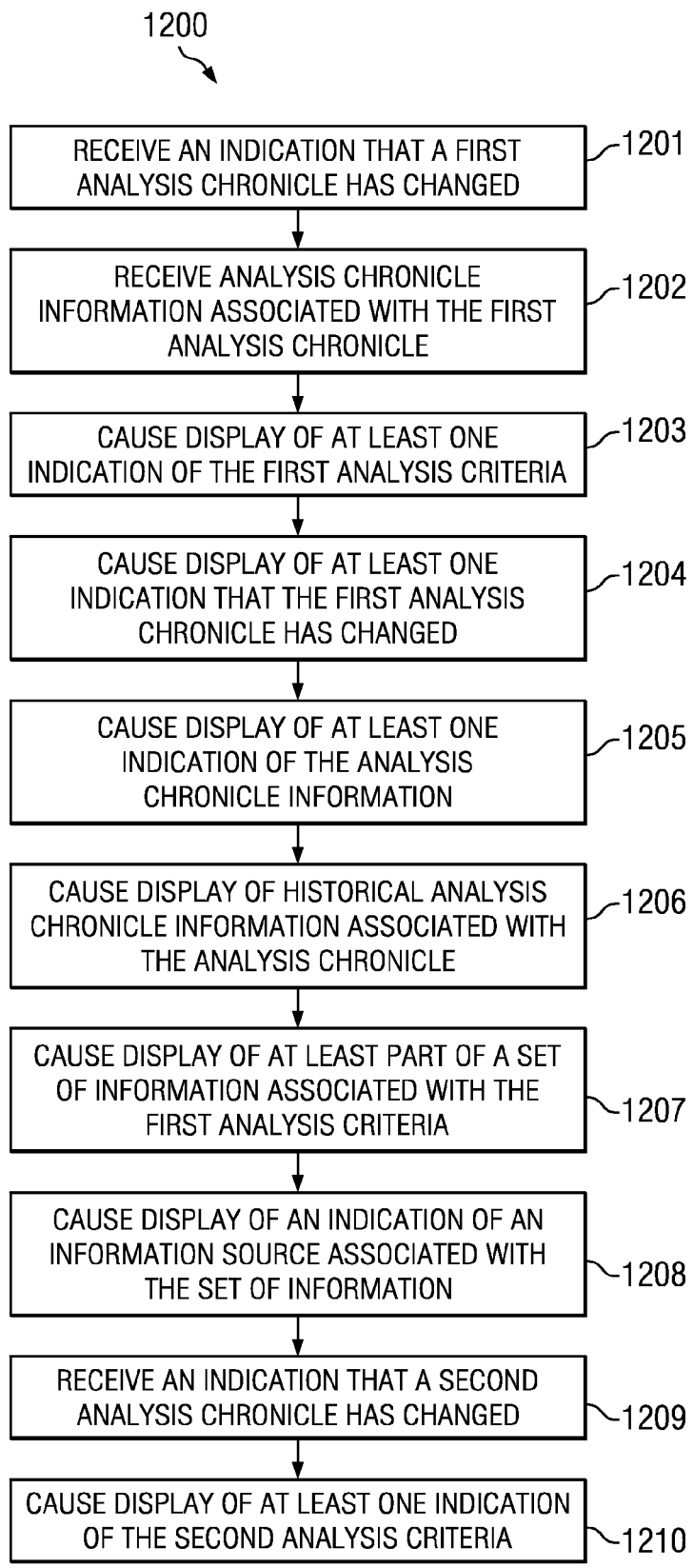
FIG. 12 is a flow diagram showing a set of operations for causing display of indication of analysis criteria according to an example embodiment.

FIG. 12 is a flow diagram showing a set of operations 1200 for causing display of indication of analysis criteria according to an example embodiment. An apparatus, for example electronic device 10 of FIG. 13 or a portion thereof, may utilize the set of operations 1200. The apparatus may comprise means, including, for example processor 20 of FIG. 13, for performing the operations of FIG. 12. In an example embodiment, an apparatus, for example device 10 of FIG. 13, is transformed by having memory, for example memory 42 of FIG. 13, comprising computer code configured to, working with a processor, for example processor 20 of FIG. 13, cause the apparatus to perform set of operations 1200.

At block 1201, the apparatus receives an indication that a first analysis chronicle has changed, similar as described with reference to block 1101 of FIG. 11.

At block 1202, the apparatus receives analysis chronicle information associated with, at least part of, the first analysis chronicle. The receiving may be similar as described with reference to block 1101 of FIG. 11. The analysis chronicle information may be similar as described with reference to FIGS. 9C-9D and FIGS. 10A-10C.

At block 1203, the apparatus causes display of at least one indication of the first analysis criteria, similar as described with reference to block 1102 of FIG. 11.

At block 1204, the apparatus causes display of at least one indication that the first analysis chronicle has changed. The causing of display may be similar as described with reference to block 1102 of FIG. 11. The indication that the first analysis chronicle has changed may be similar as described with reference to FIGS. 9A-9D and FIGS. 10A-10C.

At block 1205, the apparatus causes display of at least one indication of the analysis chronicle information. The causing of display may be similar as described with reference to block 1102 of FIG. 11. The indication of the analysis chronicle information may be similar as described with reference to FIGS. 9C-9D and FIGS. 10A-10C.

At block 1206, the apparatus causes display of a graphical representation of historical analysis chronicle information associated with the analysis chronicle. The causing of display may be similar as described with reference to block 1102 of FIG. 11. The graphical representation of historical analysis chronicle information may be similar as described with reference to FIGS. 5A-5C. The apparatus may receive historical analysis chronicle information by set of operations 600 of FIG. 6, set of operations 700 of FIG. 7, set of operations 800 of FIG. 8, and/or the like.

At block 1207, the apparatus causes display of at least part of a set of information associated with the first analysis criteria. The causing of display may be similar as described with reference to block 1102 of FIG. 11. The at least part of the set of information may be similar as described with reference to FIGS. 9C-9D and FIGS. 10A-10C. The set of information and its association with the first analysis criteria may be similar as described with reference to FIG. 1 and FIGS. 2A-2C.

At block 1208, the apparatus causes display of an indication of an information source associated with the set of information. The causing of display may be similar as described with reference to block 1102 of FIG. 11. The indication of the information source may be similar as described with reference to FIGS. 9C-9D and FIGS. 10A-10C. The information source may be similar as described with reference to FIG. 1.

At block 1209, the apparatus receives an indication that a second analysis chronicle has changed, the second analysis chronicle correlating to a second analysis criteria, similar as described with reference to block 1201. The second analysis criteria may be a different analysis criteria than the first analysis criteria. The second analysis criteria may differ from the first analysis criteria.

At block 1210, the apparatus causes display of at least one indication of the second analysis criteria, similar as described with reference to block 1203.

FIG. 13 is a block diagram showing an apparatus, such as an electronic device 10, according to an example embodiment. It should be understood, however, that an electronic device as illustrated and hereinafter described is merely illustrative of an electronic device that could benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, media players, cameras, video recorders, global positioning system (GPS) devices and other types of electronic systems, may readily employ embodiments of the invention. Moreover, the apparatus of an example embodiment need not be the entire electronic device, but may be a component or group of components of the electronic device in other example embodiments.

Furthermore, devices may readily employ embodiments of the invention regardless of their intent to provide mobility. In this regard, even though embodiments of the invention are described in conjunction with mobile communications applications, it should be understood that embodiments of the invention may be utilized in conjunction with a variety of other applications, both in the mobile communications industries and outside of the mobile communications industries.

The electronic device 10 may comprise an antenna, (or multiple antennae), a wired connector, and/or the like in operable communication with a transmitter 14 and a receiver 16. The electronic device 10 may further comprise a processor 20 or other processing circuitry that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with wireline protocols, such as Ethernet, digital subscriber line (DSL), asynchronous transfer mode (ATM), second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

As used in this application, the term 'circuitry' refers to all of the following: hardware-only implementations (such as implementations in only analog and/or digital circuitry) and to combinations of circuits and software and/or firmware such as to a combination of processor(s) or portions of processor(s)/software including digital signal processor(s), software, and memory(ies) that work together to cause an apparatus, such as a mobile phone or server, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware. The term "circuitry" would also cover, for example, a baseband integrated circuit or applications processor integrated circuit for a mobile phone or a similar integrated circuit in a cellular network device or other network device.

Processor 20 may comprise means, such as circuitry, for implementing audio, video, communication, navigation, logic functions, and/or the like, as well as for implementing embodiments of the invention including, for example, one or more of the functions described in conjunction with FIGS. 1-13. For example, processor 20 may comprise means, such as a digital signal processor device, a microprocessor device, various analog to digital converters, digital to analog converters, processing circuitry and other support circuits, for performing various functions including, for example, one or more of the functions described in conjunction with FIGS. 1-13. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory and which may, among other things, cause the processor 20 to implement at least one embodiment including, for example, one or more of the functions described in conjunction with FIGS. 1-13. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise means, such as one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. Display 28 may display two-dimensional information, three-dimensional information and/or the like.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 1-13. For example, the memories may comprise an identifier, such as an international mobile equipment identification (IMEI) code, which may uniquely identify the electronic device 10.

Electronic device 10 may comprise one or more sensor 37. Sensor 37 may comprise a light sensor, a proximity sensor, a motion sensor, a location sensor, and/or the like. For example, sensor 37 may comprise one or more light sensors at various locations on the device. In such an example, sensor 37 may provide sensor information indicating an amount of light perceived by one or more light sensors. Such light sensors may comprise a photovoltaic element, a photoresistive element, a charge coupled device (CCD), and/or the like. In another example, sensor 37 may comprise one or more proximity sensors at various locations on the device. In such an example, sensor 37 may provide sensor information indicating proximity of an object, a user, a part of a user, and/or the like, to the one or more proximity sensors. Such proximity sensors may comprise capacitive measurement, sonar measurement, radar measurement, and/or the like.

Although FIG. 13 illustrates an example of an electronic device that may utilize embodiments of the invention including those described and depicted, for example, in FIGS. 1-13, electronic device 10 of FIG. 13 is merely an example of a device that may utilize embodiments of the invention.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with one example of a computer described and depicted in FIG. 13. A computer-readable medium may comprise a computer-readable storage medium that may be any tangible media or means that can contain or store the instructions for use by or in connection with an instruction execution system, apparatus, or device, such as a computer.

If desired, the different functions discussed herein may be performed in a different order and/or concurrently with each other. For example, block 303 of FIG. 3 may be performed after block 304. In another example, block 404 of FIG. 4 may be performed after block 405. In still another example, block 409 of FIG. 4 may be performed before block 408. Furthermore, if desired, one or more of the above-described functions may be optional or may be combined. For example, blocks 405 and 407 of FIG. 4 may be optional and/or combined with block 404.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
    a processor;
    memory including computer program code, the memory and the computer program code configured to, working with the processor, cause the apparatus to perform at least the following:
    receiving an indication that a first analysis chronicle has changed, the first analysis chronicle determined by application of a first analysis criteria to a set of information received from an information source;
    causing display of at least one indication of the first analysis criteria and at least one indication that the first analysis chronicle has changed;
    receiving an indication that a second analysis chronicle has changed, the second analysis chronicle correlating to a second analysis criteria, the second analysis chronicle being associated with a plurality of information sources; and
    causing display of at least one indication of the second analysis criteria.

2. The apparatus of claim 1, wherein the indication of the first analysis criteria comprises text information.

3. The apparatus of claim 1, wherein the indication of the first analysis criteria comprises an image.

4. The apparatus of claim 3, wherein the image relates to a lens.

5. The apparatus of claim 1, wherein the memory and the computer program code are further configured to, working with the processor, cause the apparatus to further perform receiving analysis chronicle information associated with, at least part of, the first analysis chronicle, and causing display of at least one indication of the analysis chronicle information.

6. The apparatus of claim 5, wherein causing display of the at least one indication of the analysis chronicle information is performed such that the at least one indication of the analysis chronicle information is visually associated with the indication of the first analysis criteria.

7. The apparatus of claim 5, wherein the at least one indication of the analysis chronicle relates to at least one of the indication of the first analysis criteria.

8. The apparatus of claim 7, wherein the at least one indication of the analysis chronicle relates to size of at least one of the indication of the first analysis criteria.

9. The apparatus of claim 7, wherein the at least one indication of the analysis chronicle relates to lighting associated with at least one of the indication of the first analysis criteria.

10. The apparatus of claim 1, wherein the memory and the computer program code are further configured to, working with the processor, cause the apparatus to further perform causing display of a graphical representation of historical analysis chronicle information associated with the analysis chronicle.

11. The apparatus of claim 1, wherein the memory and the computer program code are further configured to, working with the processor, cause the apparatus to further perform causing display of at least part of a set of information associated with the first analysis criteria.

12. The apparatus of claim 11, wherein causing display of the at least part of the set of information is performed such that the at least part of the set of information is visually associated with the indication of the first analysis criteria.

13. The apparatus of claim 11, wherein the memory and the computer program code are further configured to, working with the processor, cause the apparatus to further perform causing display of an indication of an information source associated with the set of information.

14. The apparatus of claim 1, wherein causing display of the indication of the information source is performed such that the indication of the information source is visually associated with the at least part of the set of information.

15. The apparatus of claim 1, wherein the apparatus further comprises a display, and the causing display of the graphical representation relates to the display.

16. The apparatus of claim 1, wherein the apparatus is a mobile terminal.

17. A method, comprising:
    receiving an indication that a first analysis chronicle has changed, the first analysis chronicle determined by application of a first analysis criteria to a set of information received from an information source;
    causing display of at least one indication of the first analysis criteria and at least one indication that the first analysis chronicle has changed;
    receiving an indication that a second analysis chronicle has changed, the second analysis chronicle correlating to a second analysis criteria, the second analysis chronicle being associated with a plurality of information sources; and
    causing display of at least one indication of the second analysis criteria.

18. A computer-readable medium encoded with instructions that, when executed by a computer, perform:
    receiving an indication that a first analysis chronicle has changed, the first analysis chronicle determined by application of a first analysis criteria to a set of information received from an information source;
    causing display of at least one indication of the first analysis criteria and at least one indication that the first analysis chronicle has changed;
    receiving an indication that a second analysis chronicle has changed, the second analysis chronicle correlating to a second analysis criteria, the second analysis chronicle being associated with a plurality of information sources; and
    causing display of at least one indication of the second analysis criteria.

19. The apparatus of claim 1, wherein the second analysis chronicle differs from the first analysis chronicle.

20. The method of claim 17, wherein the second analysis chronicle differs from the first analysis chronicle.

21. The computer-readable medium of claim 18, wherein the second analysis chronicle differs from the first analysis chronicle.

* * * * *